(12) United States Patent
Davis (10) Patent No.: US 12,361,461 B2
(45) Date of Patent: Jul. 15, 2025

(54) SYSTEM AND METHOD OF DIRECTLY COMMUNICATING MERCHANDISE REQUESTS WITH VENDORS

(71) Applicant: Steven Lee Davis, Fallston, MD (US)

(72) Inventor: Steven Lee Davis, Fallston, MD (US)

( * ) Notice: Subject to any disclaimer, the term of this patent is extended or adjusted under 35 U.S.C. 154(b) by 0 days.

(21) Appl. No.: 17/720,180

(22) Filed: Apr. 13, 2022

(65) Prior Publication Data
US 2022/0327589 A1    Oct. 13, 2022

Related U.S. Application Data

(60) Provisional application No. 63/174,410, filed on Apr. 13, 2021.

(51) Int. Cl.
*G06Q 30/00*    (2023.01)
*G06Q 30/0601*    (2023.01)
*G06Q 20/12*    (2012.01)

(52) U.S. Cl.
CPC ..... *G06Q 30/0605* (2013.01); *G06Q 30/0637* (2013.01); *G06Q 20/12* (2013.01)

(58) Field of Classification Search
CPC .................................................. G06Q 30/0605
See application file for complete search history.

(56) References Cited

U.S. PATENT DOCUMENTS

| | | | | |
|---|---|---|---|---|
| 2,273,176 | A * | 3/1998 | Jorasch | G06Q 20/00 705/35 |
| 7,330,884 | B1 * | 2/2008 | Eubanks | G06Q 30/0629 709/227 |
| 8,213,047 | B2 | 7/2012 | Nakagawa | |
| 10,019,654 | B1 | 7/2018 | Pisoni | |
| 10,360,601 | B1 * | 7/2019 | Adegan | G06Q 30/0283 |
| 10,872,324 | B2 * | 12/2020 | Hasegawa | G06Q 30/06 |
| 10,956,850 | B2 * | 3/2021 | Deshpande | G06Q 10/06315 |

(Continued)

OTHER PUBLICATIONS

Uni-directional trusted path: Transaction confirmation on just one device Published in: 2011 IEEE/IFIP 41st International Conference on Dependable Systems & Networks (DSN) (pp. 1-12) Authors: Filyanov, A. • McCuney, J.M. • Sadeghiz, A.-R. • Winandy, M (Year: 2011).*

(Continued)

*Primary Examiner* — Bruce I Ebersman (57) ABSTRACT

A system and a method are provided for directly communicating merchandise requests with vendors. The system and method enable customers to directly communicate with desired vendors to submit merchandise order requests with the necessary product information for the vendor to clearly identify. The user account enters a part order request for a specific vendor account. Once the part order request has been submitted by the user account, the part order request is relayed from the user account to the specific vendor account. Then, the specific vendor account accepts or declines the part order. Afterwards, the user account accepts or declines an order quote for the part order request, if the part order request is accepted by the specific vendor account. Then, a financial transaction for the part order request is executed between the user account and the specific vendor account, if the order quote is accepted by the user account.

4 Claims, 11 Drawing Sheets

(56) References Cited

U.S. PATENT DOCUMENTS

| | | | | |
|---|---|---|---|---|
| 2007/0061211 | A1* | 3/2007 | Ramer | G06Q 30/02 |
| | | | | 705/25 |
| 2013/0290172 | A1* | 10/2013 | Mashinsky | G06Q 20/28 |
| | | | | 705/39 |
| 2015/0154687 | A1* | 6/2015 | Bellora | G06Q 30/0637 |
| | | | | 705/26.82 |
| 2016/0063435 | A1 | 3/2016 | Shah | |
| 2019/0172050 | A1 | 6/2019 | Winters | |
| 2019/0385205 | A1* | 12/2019 | Barton | G06Q 20/12 |
| 2019/0385206 | A1* | 12/2019 | DeLuca | G06Q 30/0617 |
| 2020/0404344 | A1* | 12/2020 | Bathory | H04N 21/2187 |
| 2021/0073360 | A1* | 3/2021 | Davis | G06F 21/105 |
| 2021/0157998 | A1* | 5/2021 | Rodriguez | G06V 20/20 |
| 2021/0192412 | A1* | 6/2021 | Krishnaswamy | |
| | | | | G06Q 10/06375 |
| 2022/0005094 | A1* | 1/2022 | Barton | G06Q 20/12 |
| 2022/0172265 | A1* | 6/2022 | Mackinnon | G06F 16/958 |

OTHER PUBLICATIONS

NetBill: An Internet commerce system optimized for network delivered services . Published in: Digest of Papers. COMPCON'95. Technologies for the Information Superhighway (pp. 20-25) Authors: Sirbu, M. • Tygar, J.D. (Year: 1995).*
Returning Control of Data to Users with a Personal Information Crunch—A Position Paper IEEE, (Year: 2017).*
Order Management System for Time and Quantity Saving of Recipes Ingredients Using GPS Tracking Systems IEEE (Year: 2021).*
NetBill: an Internet commerce system optimized for network-delivered services, IEEE (Year: 1995).*
Successful E-Commerce, IEEE (Year: 1999).*
Baker, Natasha, New apps help shoppers identify items using image recognition, Retrieved from Reuters, Aug. 26, 2013 <URL: https://www.reuters.com/article/us-apps-pounce-idUSBRE97P06J20130826>.

* cited by examiner

SYSTEM AND METHOD OF DIRECTLY COMMUNICATING MERCHANDISE REQUESTS WITH VENDORS

The current application claims a priority to the U.S. provisional patent application Ser. No. 63/174,410 filed on Apr. 13, 2021.

FIELD OF THE INVENTION

The present invention relates generally to online commerce and communication networks. More specifically, the present invention provides a system and method that enables users to submit merchandise orders directly to several vendors.

BACKGROUND OF THE INVENTION

Nowadays, there are several online commerce platforms that allow users to buy and sell parts and services over an electronic network, primarily the Internet. Unfortunately, the current online commerce platforms have major issues that prevent the quick and efficient purchasing and selling of products. One of the major reasons is that every product can be labeled or called differently by manufacturers, retailers, and customers. This issue is highlighted when the customer wants to purchase a product, especially an uncommon one, and the vendor fails to recognize the right product. For example, a customer calls in an order, and the vendor ships a product that matches the product the customer asked for according to the vendor's system. However, the customer finds that the product is not what they ordered, so the customer would have to return the product, and the vendor would have to ship the right product. This process wastes time and can increase the operational costs of the vendors.

Therefore, an objective of the present invention is to provide a system and method of facilitating the direct communication between customers and vendors. By directly connecting the customers with vendors, the present invention ensures that the necessary product information is transmitted to the desired vendor for the purchase of the correct product. Another objective of the present invention is to provide a system and method that enables the user to transmit the necessary product information using multiple communications means so that the vendor accurately identifies the product and can promptly ship the product to the customer. Further, another objective of the present invention is to provide a system and method that enables vendors to be more efficient and profitable by reducing operational costs due to the shipment of incorrect orders. Additional features and benefits are further discussed in the sections below.

SUMMARY OF THE INVENTION

The present invention is a system and method of directly communicating merchandise requests with vendors. The present invention connects users with multiple vendors using different communication methods for speed, accuracy, variety, and accountability. The present invention facilitates the direct transmission of order requests from customers to select vendors for the accurate and quick purchase and delivery of products. The present invention enables users to easily manage order history, payments, request status, etc. Further, the present invention enables vendors to manage their own order history, pending orders, employee performance, etc. Overall, customers can place an accurate order request anytime while ensuring a prompt response from the desired vendors.

Thanks to the present invention, wait times are reduced for the customers as well as operational costs being reduced for the vendors. Customers are able to quickly contact any desired vendor (manufacture, retailer, etc.) anytime of the day with the appropriate information to place an order for the desired product using the same order request. This eliminates the need for the customer to search for different vendors and submit multiple order requests to every single vendor. Thus, the process of ordering products becomes more efficient for the customer and the vendor by making the customer spend less time searching vendors and by making the vendor more productive in responding to customer's requests.

DETAIL DESCRIPTIONS OF THE INVENTION

All illustrations of the drawings are for the purpose of describing selected versions of the present invention and are not intended to limit the scope of the present invention.

Figure 1:
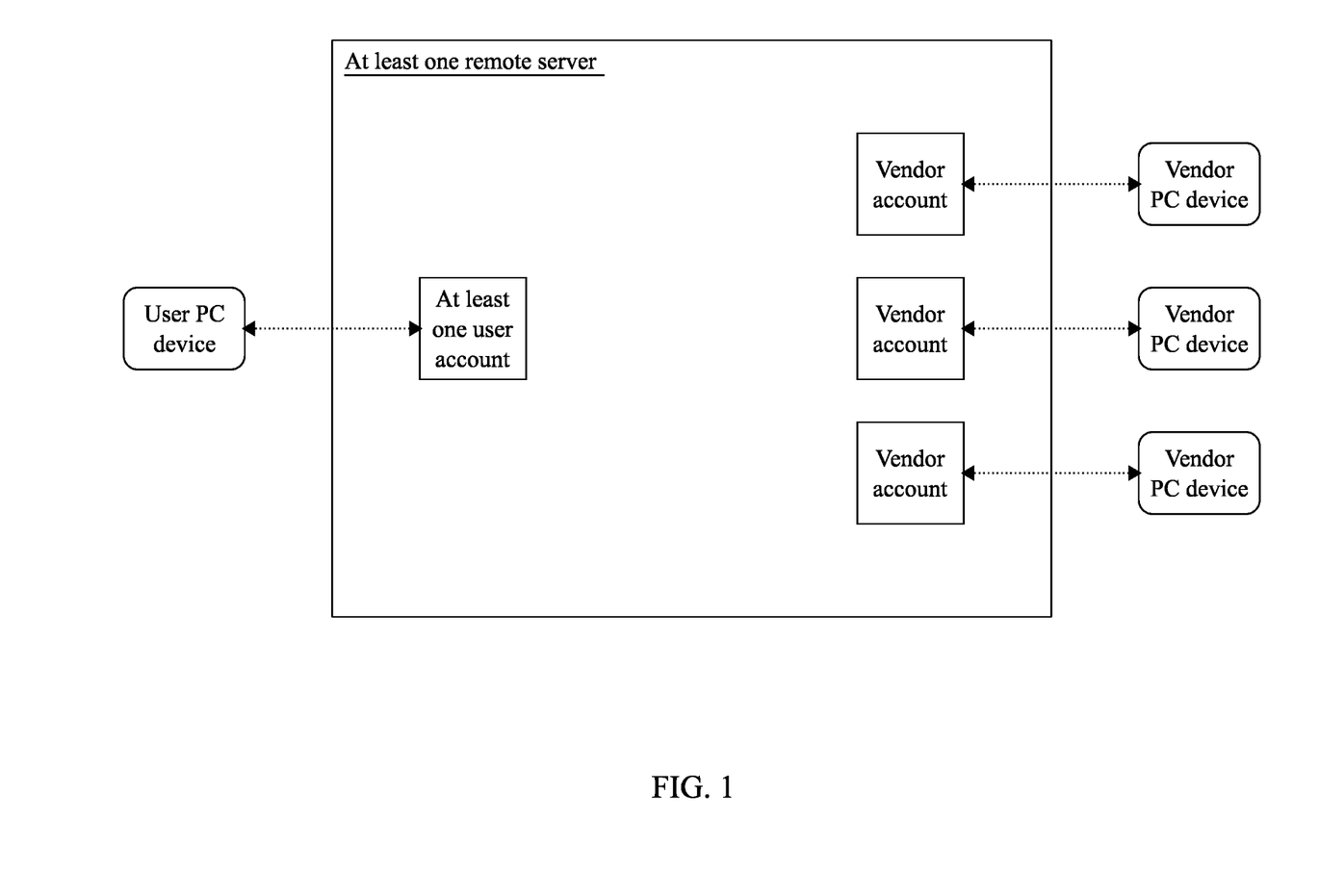
FIG. 1 is a block diagram for the system of the present invention.

The present invention is a system and method of directly communicating merchandise requests with vendors. The present invention enables customers to directly communicate with desired vendors to submit merchandise order requests with the necessary product information for the vendor to clearly identify. The present invention is preferably designed for the automotive aftermarket but can also be modified to enable the purchase and selling of other merchandise. As can be seen in FIG. 1, to do so, the system of the present invention preferably includes at least one user account managed by at least one remote server (Step A). The user account enables the owner of the account to directly communicate with the desired vendors to submit the desired order requests. The user account is associated with a corresponding user personal computing (PC) device. The user PC device can be, but is not limited to, a cellular phone, a laptop, a desktop computer, a tablet computer, etc. In addition, the system of the present invention further includes a plurality of vendor accounts managed by the remote server (Step B). Each vendor account is preferably owned by different vendors which may include, but is not limited to, manufacturers, retailers, service providers, etc. Further, each vendor account is associated with a corresponding vendor PC device. Similar to the user PC device, the vendor PC device can be, but is not limited to, a cellular phone, a laptop, a desktop computer, a tablet computer, etc. The system may also be provided as a software application that can be installed and launched on the user PC device and the vendor PC device so that both the user account and the vendor account can communicate to each other through the software application. For example, the software application can be a mobile application, a desktop application, a cloud application, etc.

Figure 2:
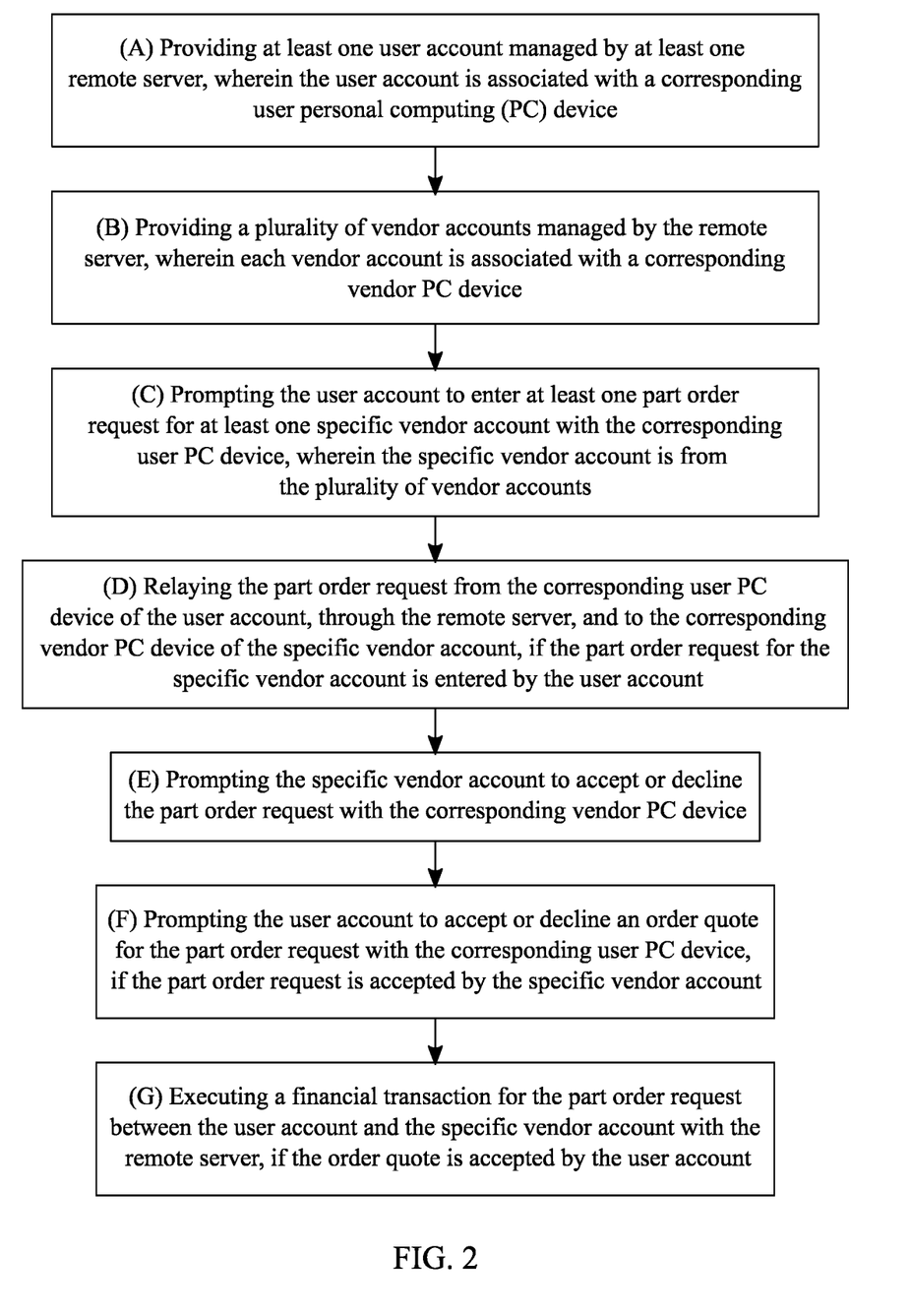
FIG. 2 is a flowchart illustrating the overall process for the method of the present invention.

The overall method of the present invention enables users to quickly get product tracking information, follow up, share information, and reorder the product quickly if the first vendor chosen does not have product availability. As can be seen in FIG. 2, the overall method starts by prompting the user account to enter at least one part order request for at least one specific vendor account with the corresponding user PC device (Step C). The specific vendor account is from the plurality of vendor accounts which the user can choose from before submitting the part order request. The part order request is relayed from the corresponding user PC device of the user account, through the remote server, and to the corresponding vendor PC device of the specific vendor account, if the part order request for the specific vendor account is entered by the user account (Step D). The user account can also select multiple vendor accounts to relay the part order request to. Then, the specific vendor account is prompted to accept or decline the part order request with the corresponding vendor PC device (Step E). Afterwards, the user account is prompted to accept or decline an order quote for the part order request with the corresponding user PC device, if the part order request is accepted by the specific vendor account (Step F). If the part order request is relayed to several vendor accounts, each of the vendor accounts can provide a respective order quote. The user account is prompted to accept or decline each of the order quotes from the several vendor accounts. The overall process concludes by executing a financial transaction for the part order request between the user account and the specific vendor account with the remote server, if the order quote is accepted by the user account (Step G). If several order quotes are submitted by the different vendor accounts, the user account chooses the best order quote, and the financial transaction is executed for the chosen order quote.

Figure 3:
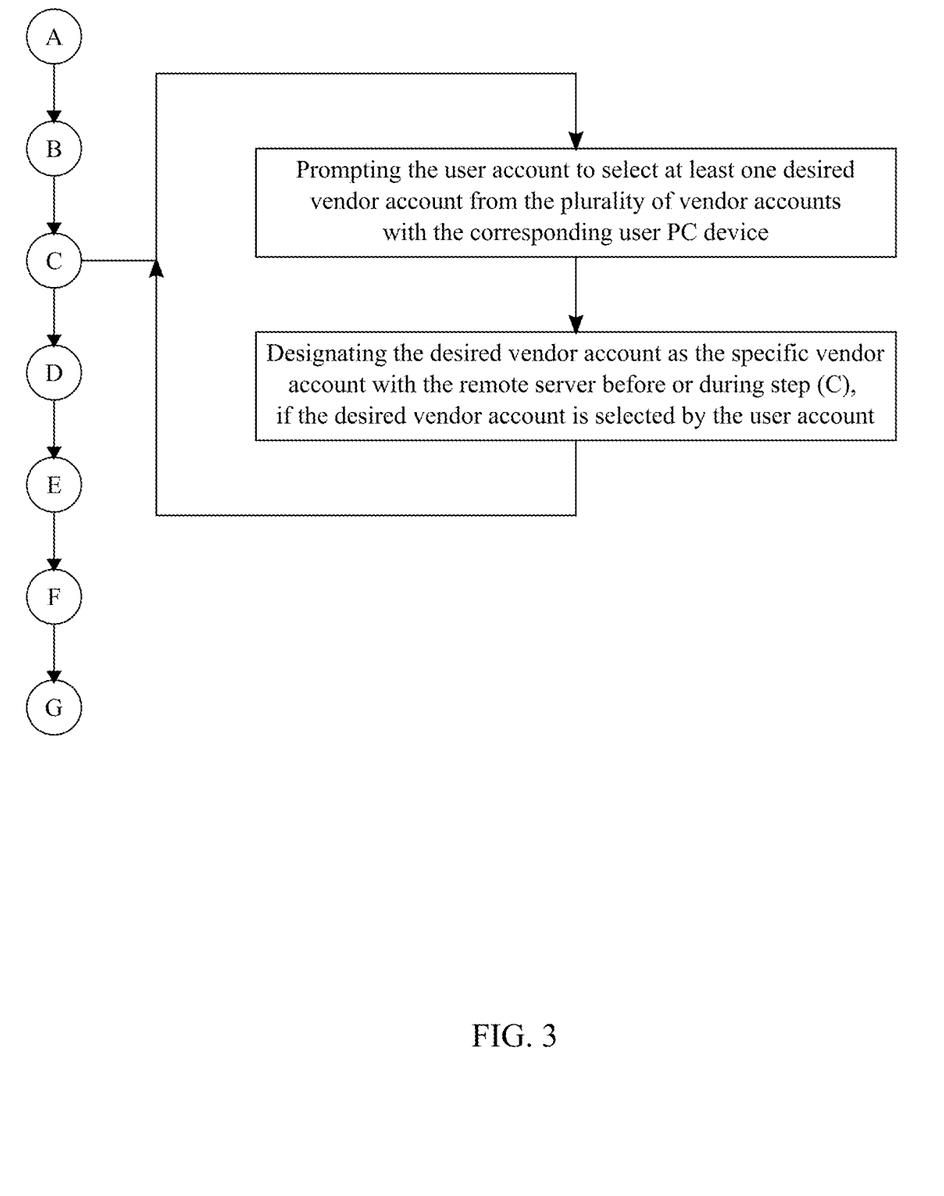
FIG. 3 is a flowchart illustrating the subprocess of vendor selection by the user account.

As previously discussed, the present invention enables customers to directly communicate with several vendors to obtain the best order quote for the order request of the customer. The system of the present invention provides the user account with a list of vendor accounts to choose from which can provide the products or services needed by the user account. As can be seen in FIG. 3, the subprocess of vendor selection starts by prompting the user account to select at least one desired vendor account from the plurality of vendor accounts with the corresponding user PC device. The user account can select the one or more vendor accounts based on different criteria, such as, but not limited to, proximity of the vendor to the user, vendor rating, etc. The vendor selection subprocess can be performed during or after the user has registered to the software application, where a list of the plurality of vendor accounts is provided for selection. Then, the desired vendor account is designated as the specific vendor account with the remote server before or during Step C, if the desired vendor account is selected by the user account. Thus, the part order request is sent to each specific vendor account the user account has chosen. This expedites the search of the desired part by enabling the user to inquire multiple vendors at the same time.

Figure 4:
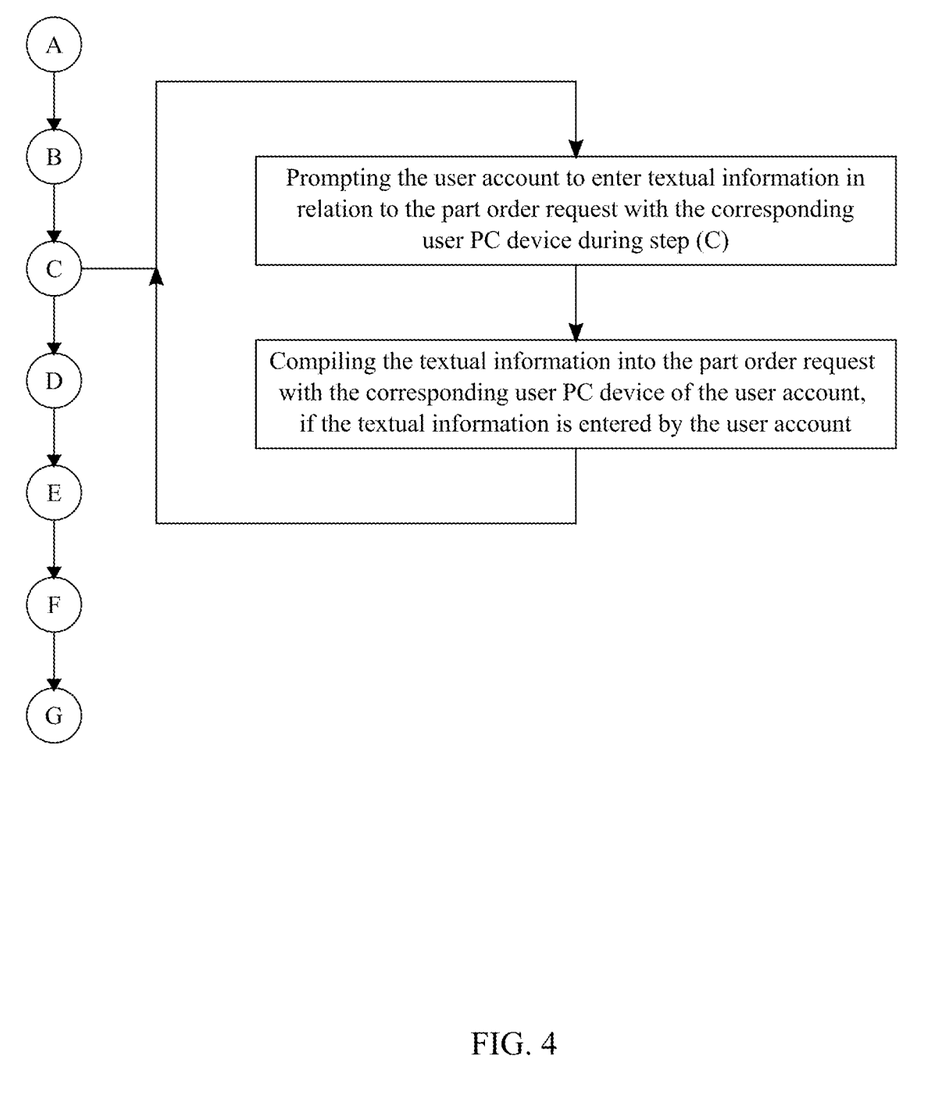
FIG. 4 is a flowchart illustrating the subprocess of providing textual information by the user account.

To ensure that the specific vendor account is provided with the information necessary to identify the part correctly and promptly, the present invention enables the user to provide part information using different communication means. The part identification may be performed by a vendor consultant manually by utilizing the information provided in the part order request. Alternatively, the part identification may be performed automatically using machine learning and image recognition software to identify the part from the information provided in the part order request. In one embodiment, the user account can input textual information that clearly describes the details of the part being requested. As can be seen in FIG. 4, the subprocess of providing textual information starts by prompting the user account to enter textual information in relation to the part order request with the corresponding user PC device during Step C. The textual information can include, but is not limited to, a part description, serial number, manufacturing information, special requests, etc. After the user account has been entered by the user account, the textual information is compiled into the part order request with the corresponding user PC device of the user account, if the textual information is entered by the user account.

Figure 5:
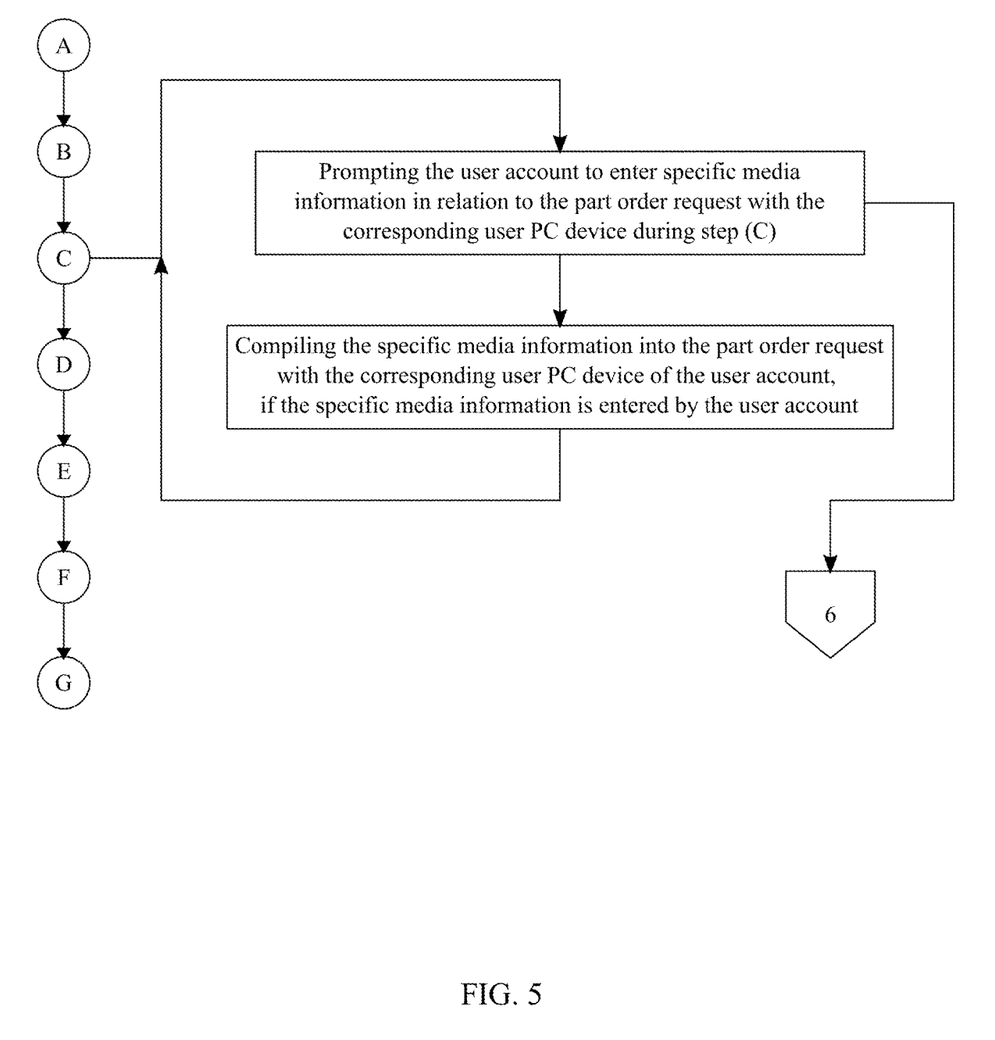
FIG. 5 is a flowchart illustrating the subprocess of providing specific media information by the user account.

In another embodiment, the user account can input specific media information that provides visual means for the specific vendor account to identify the part being requested. As can be seen in FIG. 5, the subprocess of providing specific media information starts by prompting the user account to enter specific media information in relation to the part order request with the corresponding user PC device of the user account during Step C. The specific media information can include, but is not limited to, pictures or videos of the part alone or when assembled in the vehicle. After the specific media information has been entered by the user account, the specific media information is compiled into the part order request with the corresponding user PC device of the user account, if the specific media information is entered by the user account. If the user is capturing the specific media information when the part is assembled, the user may want to highlight the desired part that is being requested to avoid confusion from the vendor. To do so, the system of the present invention enables the user to annotate the specific media to highlight the part or parts being requested.

Figure 6:
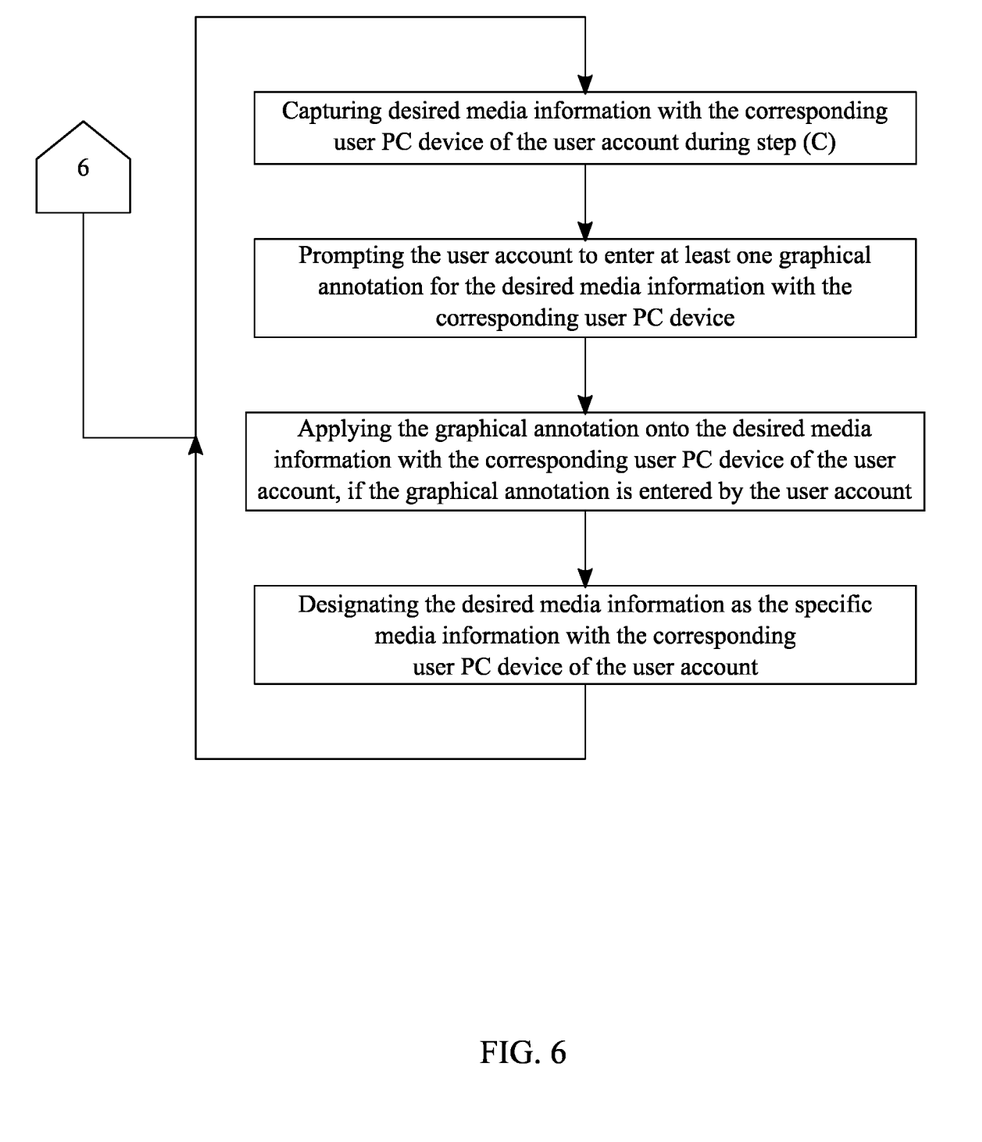
FIG. 6 is a flowchart illustrating the subprocess of annotating the specific media information by the user account.

As can be seen in FIG. 6, the subprocess of annotating the specific media information starts by capturing desired media information with the corresponding user PC device of the user account during Step C. For example, the user can capture a video of the part by using the camera of the corresponding user PC device. After the desired media information is capture, the user account is prompted to enter at least one graphical annotation for the desired media information with the corresponding user PC device. For example, the user can utilize the screen of a cellular phone to highlight or encircle the part being shown on the captured photo or video. This way, the vendor can correctly identify the part that the user desires to order, which allows the right product to be shipped to the user. Once the user account enters the graphical annotation for the desired media information, the graphical annotation is applied onto the desired media information with the corresponding user PC device of the user account. Then, the desired media information is designed as the specific media information with the corresponding user PC device of the user account, which is relayed to the specific vendor account along with the part order request. Thus, the vendor is equipped with all the necessary information to correctly identify the part being ordered to avoid potential returns.

Figure 7:
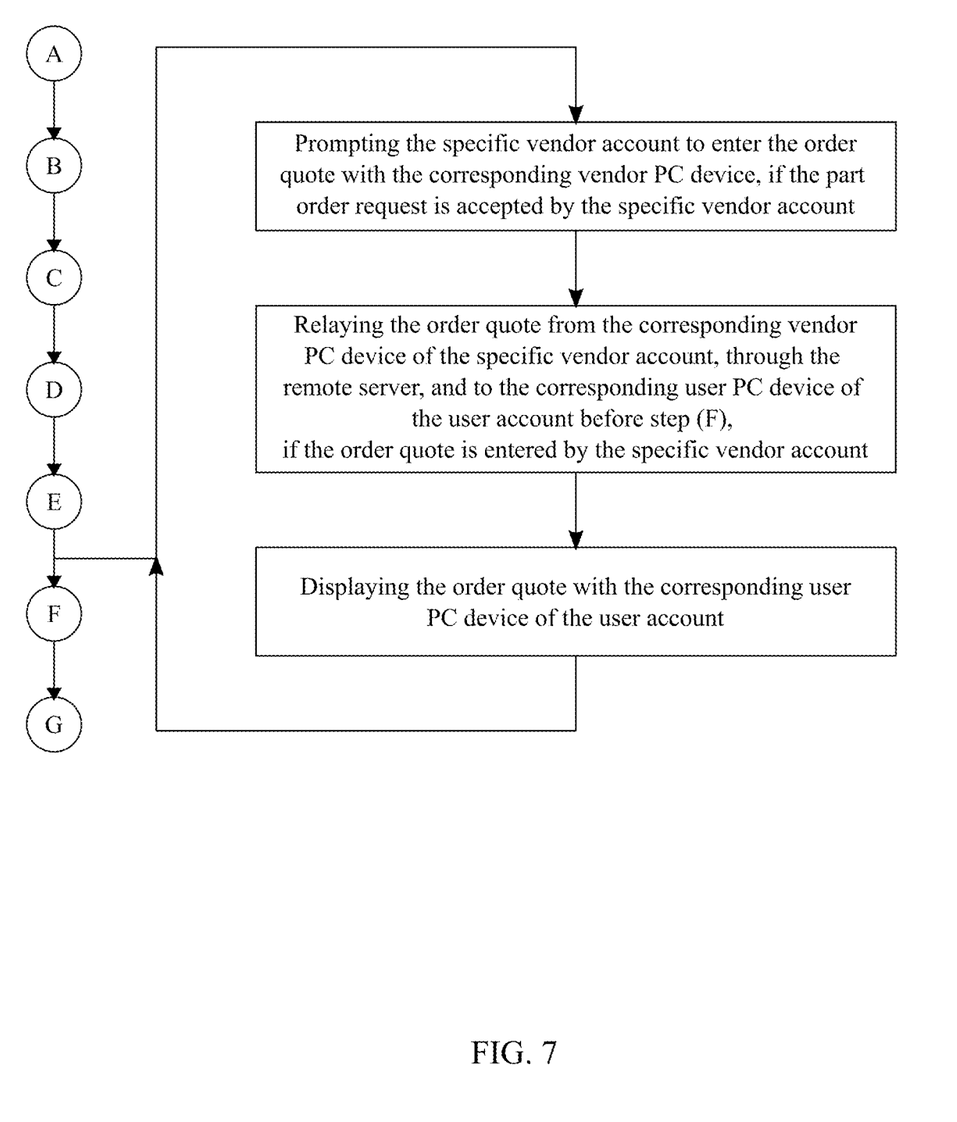
FIG. 7 is a flowchart illustrating the subprocess of generating an order quote by the vendor account.

As previously discussed, each of the vendors is able to provide an order quote corresponding to the part order request so that the user is given multiple options to choose from. To do so, the system of the present invention enables vendors to submit an order quote according to the capabilities of the vendor to fulfill the part order request. As can be seen in FIG. 7, the subprocess of generating an order quote starts by prompting the specific vendor account to enter the order quote with the corresponding vendor PC device, if the part order request is accepted by the specific vendor account. The order quote can include, but is not limited to, different details, such as part cost, shipping costs, delivery date, etc. Once the order quote is entered by the specific vendor account, the order quote is relayed from the corresponding vendor PC device of the specific vendor account, through the remote server, and to the corresponding user PC device of the user account before Step F. Then, the order quote is displayed with the corresponding user PC device of the user account. The subprocess of generating an order quote is preferably performed by every vendor account that has accepted the part order request. This way, the user account can receive sufficient order quotes to make the best choice when selecting a vendor account to order the desired part.

Figure 8:
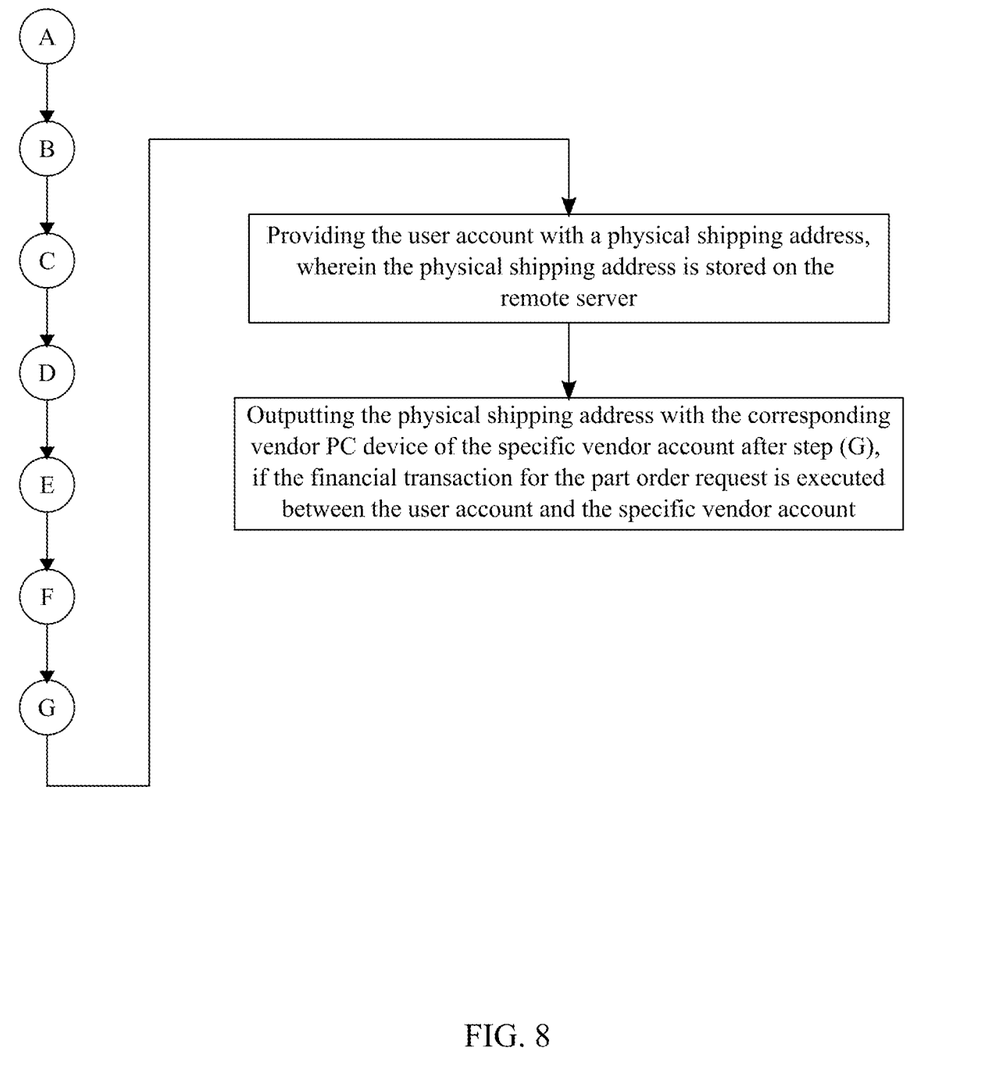
FIG. 8 is a flowchart illustrating the subprocess of providing shipping information by the user account.

Once the user account has selected an order quote and the financial transaction has been processed, the system of the present invention facilitates the processing of the order so that the order is shipped to the user as soon as possible. To do so, the present invention enables that the vendor has all the necessary information to deliver the product once the order has been processed by the vendor. As can be seen in FIG. 8, the subprocess of providing shipping information starts by providing the user account with a physical shipping address. The physical shipping address is stored on the remote server so that the shipping information is automatically sent to the vendor account for quick order processing. Then, the physical shipping address is outputted with the corresponding vendor PC device of the specific vendor account after Step G, if the financial transaction for the part order request is executed between the user account and the specific vendor account. This way, the vendor account can quickly process the order once the financial transaction is completed.

Figure 11:
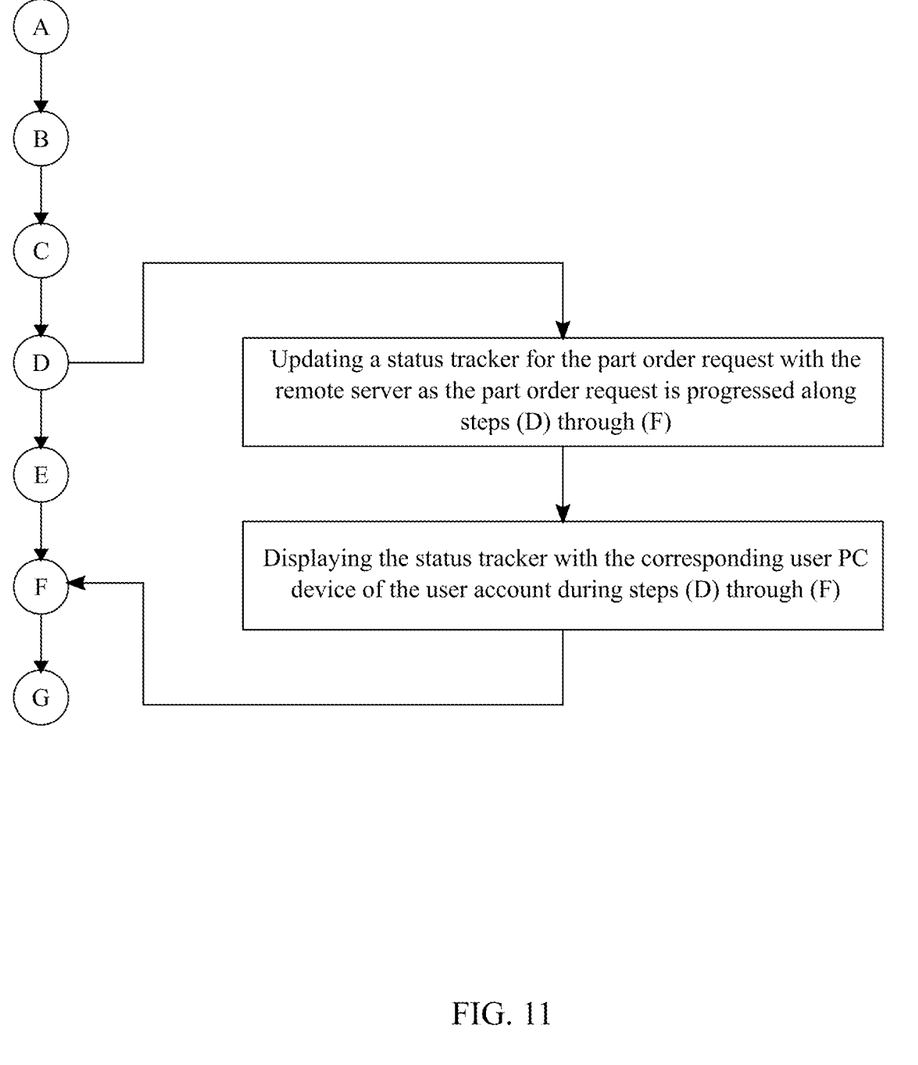
FIG. 11 is a flowchart illustrating the subprocess of updating the order status.

During the whole process, the system of the present invention is able to maintain both the users and the vendors updated with every change in the order status. To do so, the system of the present invention notifies the user of any changes to the status of the part order request. As can be seen in FIG. 11, the subprocess of updating the order status starts by updating a status tracker for the part order request with the remote server as the part order request is progressed along Steps D through F. The status tracker refers to a system tool that enables the user to check on the status of the part order request. For example, the user can check when the specified vendor account has accepted or declined the part order request, when the corresponding order quote has been provided by the vendor account, when the financial transaction has been processed, and/or when the part has been shipped and delivered. To make the process automatic, the status tracker is displayed with the corresponding user PC device of the user account during steps D through F. This way, the user is always updated on any changes to the part order request. Similarly, the vendor is also notified using the status tracker of new part order requests, if the user account has accepted or declined the order quote, and/or if the financial transaction has been processed.

Figure 9:
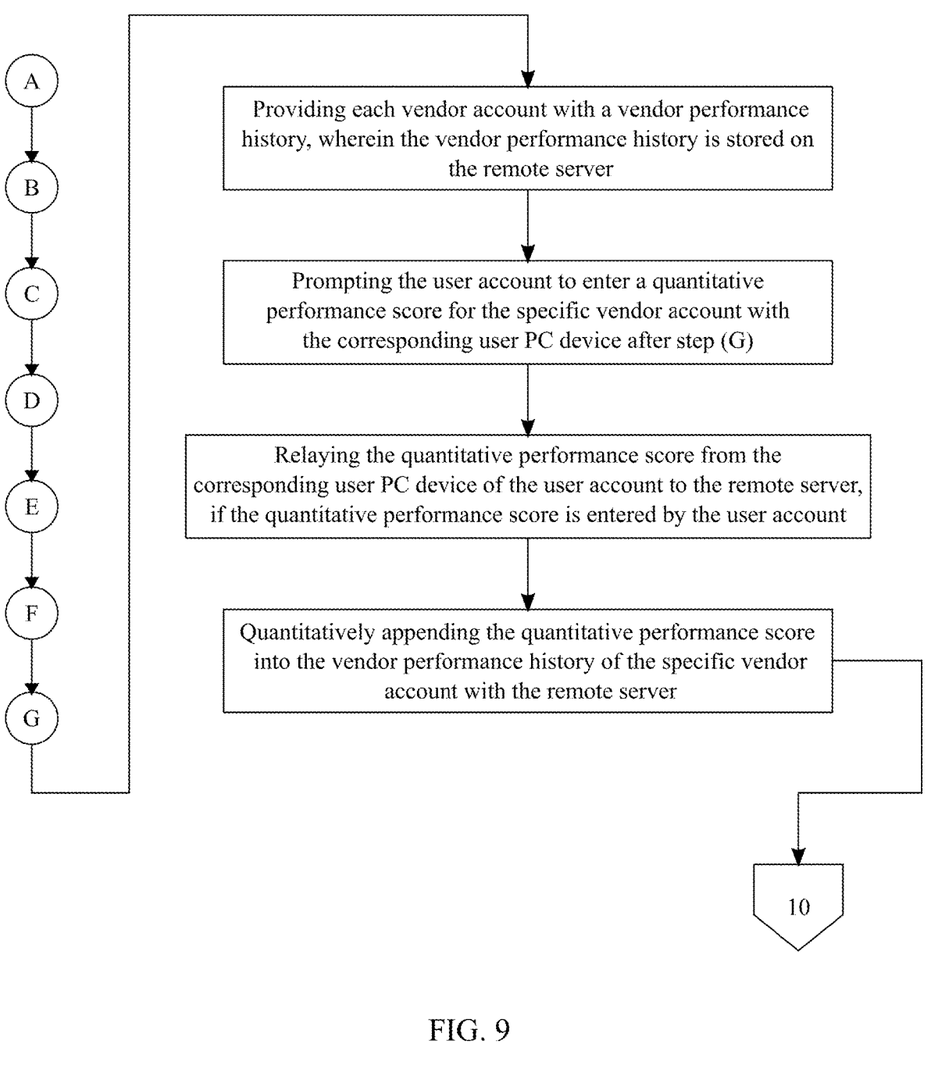
FIG. 9 is a flowchart illustrating the subprocess of evaluating the vendor performance by the user account.

In addition to facilitating the quick fulfilling of orders, the present invention enables the vendor to analyze the vendor's performance. As can be seen in FIG. 9, the subprocess of evaluating the vendor performance starts by providing each vendor account with a vendor performance history. The vendor performance history is stored on the remote server to facilitate access to authorized users, such as the system administrators and the corresponding vendors. The user account is prompted to enter a quantitative performance score for the specific vendor account with the corresponding user PC device after Step G so that the user account can provide feedback on the part order request. The quantitative performance score can correspond to different factors related to the part order request, such as how well the vendor performed, how fast was the part delivered, the quality of service, etc. Then, the quantitative performance score is relayed from the corresponding user PC device of the user account to the remote server, if the quantitative performance score is entered by the user account. Then, to update the vendor performance history, the quantitative performance score is quantitatively appended into the vendor performance history of the specific vendor account with the remote server. This way, every new vendor performance evaluation is recorded in the vendor performance history after the part order has been processed and fulfilled.

Figure 10:
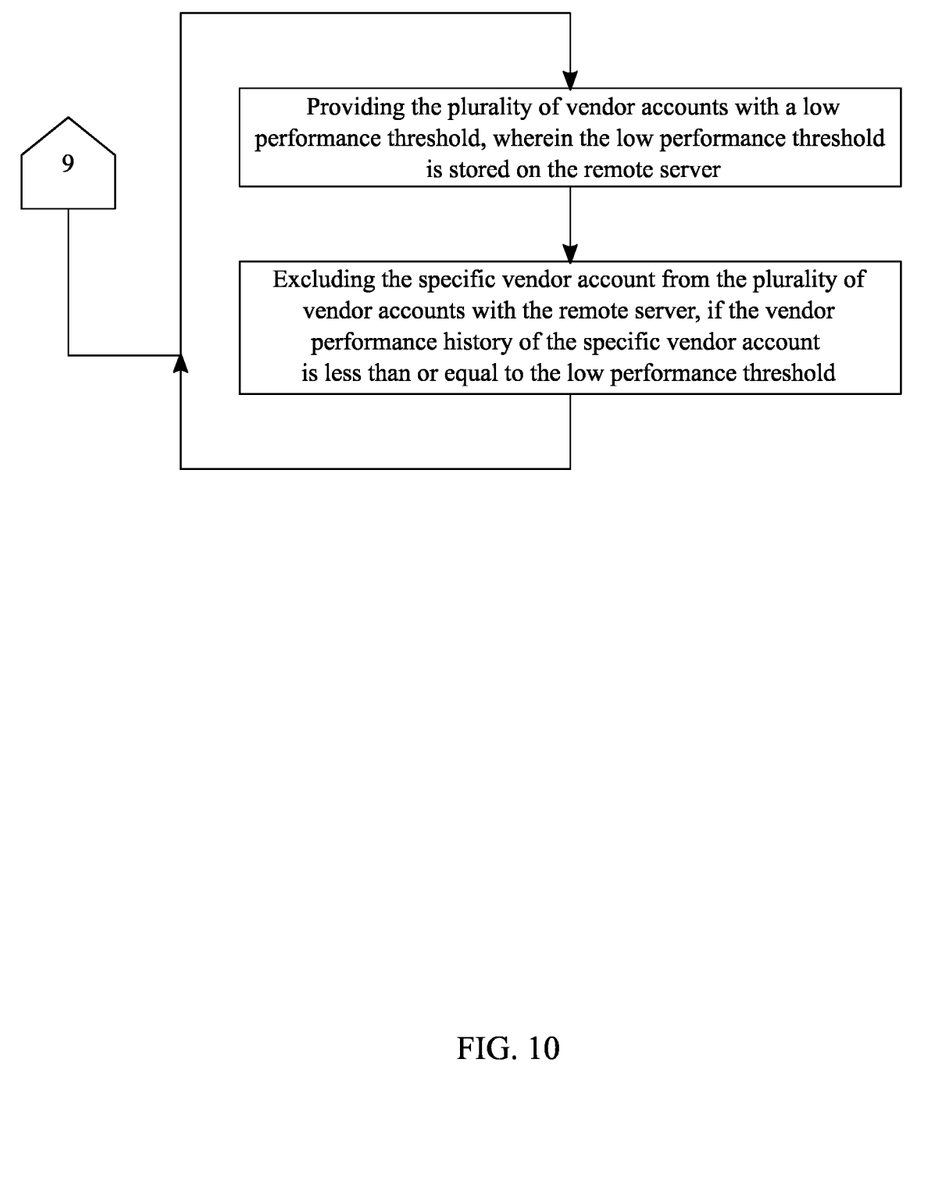
FIG. 10 is a flowchart illustrating the subprocess of maintain a high level of vendor service.

The vendor performance history is not only useful for vendors to improve the vendor performance. The vendor performance history can also be used by the system to maintain a high level of quality from participating vendors so that the users can always receive the best service. As can be seen in FIG. 10, the subprocess of maintain a high level of vendor service starts by providing the plurality of vendor accounts with a low performance threshold, wherein the low performance threshold is stored on the remote server. The low performance threshold is a parameter established by the system of the present invention that determines the minimum level of quality service that the participating vendors must achieve in order to remain active. If the vendor performance history of the specific vendor account is less than or equal to the low performance threshold, the specific vendor account is excluded from the plurality of vendor accounts with the remote server. This way, only vendor accounts who meet the highest level of service are available to users.

Although the invention has been explained in relation to its preferred embodiment, it is to be understood that many other possible modifications and variations can be made without departing from the spirit and scope of the invention.

What is claimed is:

1. A method of directly communicating merchandise requests with vendors, the method comprising the steps of:
(A) providing at least one user account managed by at least one remote server, wherein the user account is associated with a corresponding user personal computing (PC) device;
(B) providing a plurality of vendor accounts managed by the remote server, wherein each vendor account is associated with a corresponding vendor PC device;
(C) prompting the user account to enter at least one part order request for at least one specific vendor account with the corresponding user PC device, wherein the specific vendor account is from the plurality of vendor accounts, wherein the part order request is a request by the user account to order a part from the specific vendor account;

(D) relaying the part order request from the corresponding user PC device of the user account, through the remote server, and to the corresponding vendor PC device of the specific vendor account, wherein the part order request for the specific vendor account was entered by the user account;

(E) prompting the specific vendor account to accept or decline the part order request with the corresponding vendor PC device;

(F) prompting the user account to accept or decline an order quote for the part order request with the corresponding user PC device, wherein the part order request was accepted by the specific vendor account;

(G) executing a financial transaction for the part order request between the user account and the specific vendor account with the remote server, wherein the order quote was accepted by the user account;

prompting the user account to enter specific media information in relation to the part order request with the corresponding user PC device during step (C);

compiling the specific media information into the part order request with the corresponding user PC device of the user account, wherein the specific media information was entered by the user account;

receiving captured media information with a camera of the corresponding user PC device of the user account during step (C), wherein the captured media information is either a photo or a video;

prompting the user account to enter at least one graphical annotation for the captured media information with the corresponding user PC device, wherein the graphical annotation is a highlight or an outline of a section in the captured media information;

applying the graphical annotation onto the desired media information with the corresponding user PC device of the user account, wherein the graphical annotation was entered by the user account;

designating the captured media information as the specific media information with the corresponding user PC device of the user account;

prompting the specific vendor account to enter the order quote with the corresponding vendor PC device, wherein the part order request was accepted by the specific vendor account;

relaying the order quote from the corresponding vendor PC device of the specific vendor account, through the remote server, and to the corresponding user PC device of the user account before step (F), wherein the order quote was entered by the specific vendor account;

displaying the order quote with the corresponding user PC device of the user account;

providing each vendor account with a vendor performance history, wherein the vendor performance history is stored on the remote server;

prompting the user account to enter a quantitative performance score for the specific vendor account with the corresponding user PC device after step (G);

relaying the quantitative performance score from the corresponding user PC device of the user account to the remote server, wherein the quantitative performance score was entered by the user account;

appending the quantitative performance score into the vendor performance history of the specific vendor account with the remote server;

providing the plurality of vendor accounts with a low performance threshold, wherein the low performance threshold is stored on the remote server;

excluding the specific vendor account from the plurality of vendor accounts with the remote server, wherein the vendor performance history of the specific vendor account was less than or equal to the low performance threshold;

updating a status tracker for the part order request with the remote server as the part order request is progressed along steps (D) through (F); and displaying the status tracker with the corresponding user PC device of the user account during steps (D) through (F).

2. The method as claimed in claim 1 comprising the steps of:

prompting the user account to select at least one desired vendor account from the plurality of vendor accounts with the corresponding user PC device; and designating the desired vendor account as the specific vendor account with the remote server before or during step (C), wherein the desired vendor account was selected by the user account.

3. The method as claimed in claim 1 comprising the steps of:

prompting the user account to enter textual information in relation to the part order request with the corresponding user PC device during step (C); and compiling the textual information into the part order request with the corresponding user PC device of the user account, wherein the textual information was entered by the user account.

4. The method as claimed in claim 1 comprising the steps of:

providing the user account with a physical shipping address, wherein the physical shipping address is stored on the remote server; and outputting the physical shipping address with the corresponding vendor PC device of the specific vendor account after step (G), wherein the financial transaction for the part order request was executed between the user account and the specific vendor account.

* * * * *